Feb. 26, 1952  J. J. OSPLACK  2,587,202
HOBBING GRINDER AND WHEEL DRESSER
Filed March 5, 1947  5 Sheets-Sheet 1

INVENTOR
Joseph J. Osplack
BY
Pennie, Edmonds, Morton & Barrows
ATTORNEYS

Feb. 26, 1952 — J. J. OSPLACK — 2,587,202
HOBBING GRINDER AND WHEEL DRESSER
Filed March 5, 1947 — 5 Sheets-Sheet 2
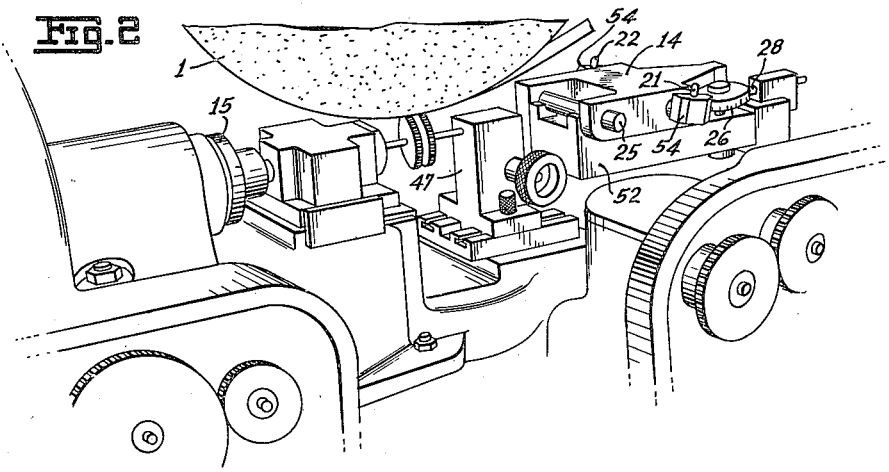
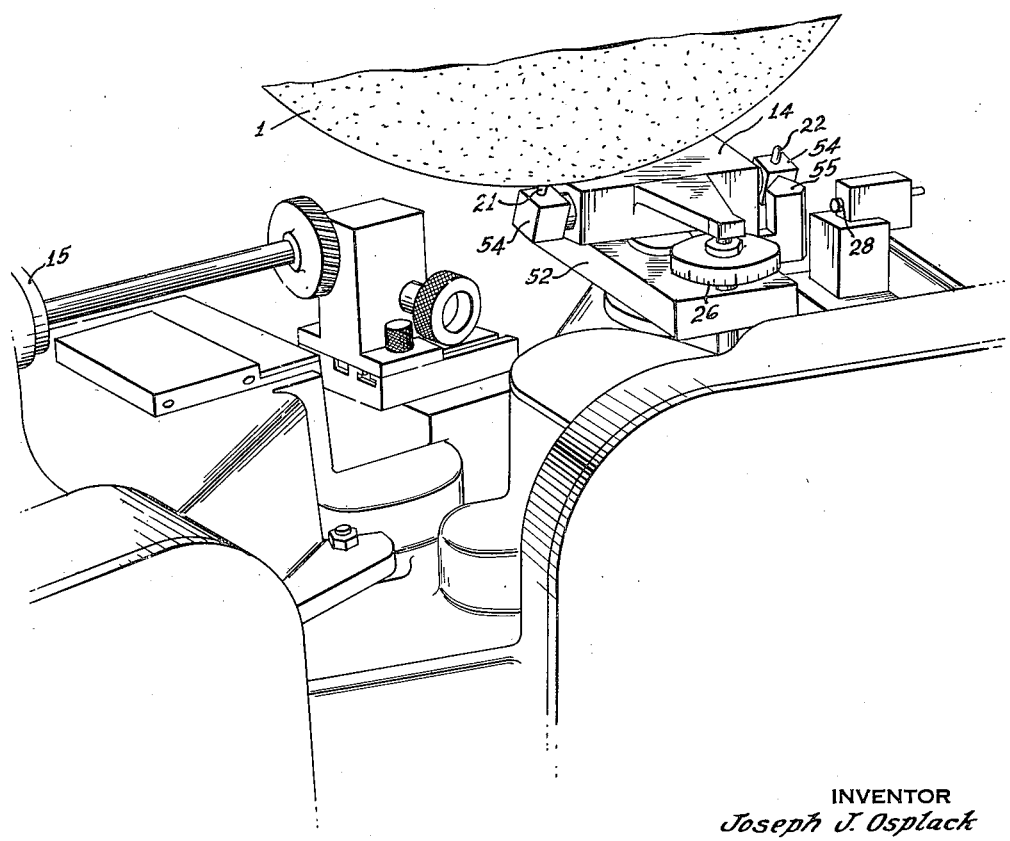
INVENTOR
Joseph J. Osplack
BY
Pennie, Edmonds, Morton & Barrows
ATTORNEYS Feb. 26, 1952                J. J. OSPLACK                2,587,202
                      HOBBING GRINDER AND WHEEL DRESSER
Filed March 5, 1947                                5 Sheets-Sheet 3

INVENTOR
Joseph J. Osplack
BY
Rennie, Edmonds, Morton & Barrows
ATTORNEYS

Feb. 26, 1952     J. J. OSPLACK     2,587,202
HOBBING GRINDER AND WHEEL DRESSER
Filed March 5, 1947     5 Sheets-Sheet 4
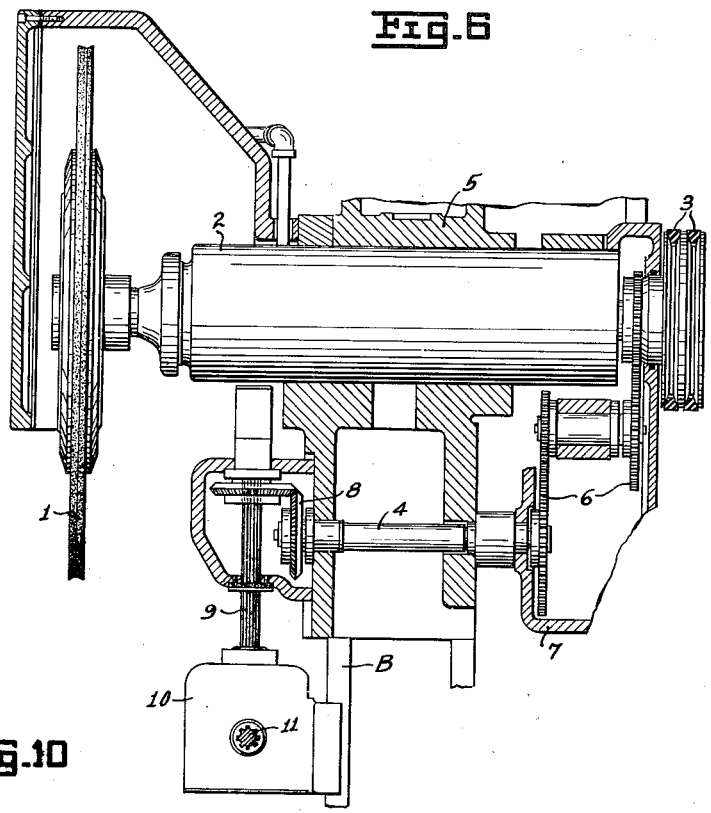
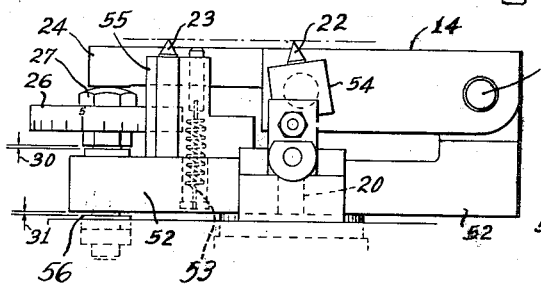
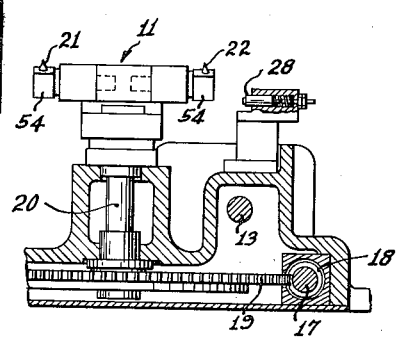
INVENTOR
Joseph J. Osplach
BY
Rennie, Edmonds, Morton & Renown
ATTORNEYS Feb. 26, 1952 J. J. OSPLACK 2,587,202
HOBBING GRINDER AND WHEEL DRESSER
Filed March 5, 1947 5 Sheets-Sheet 5
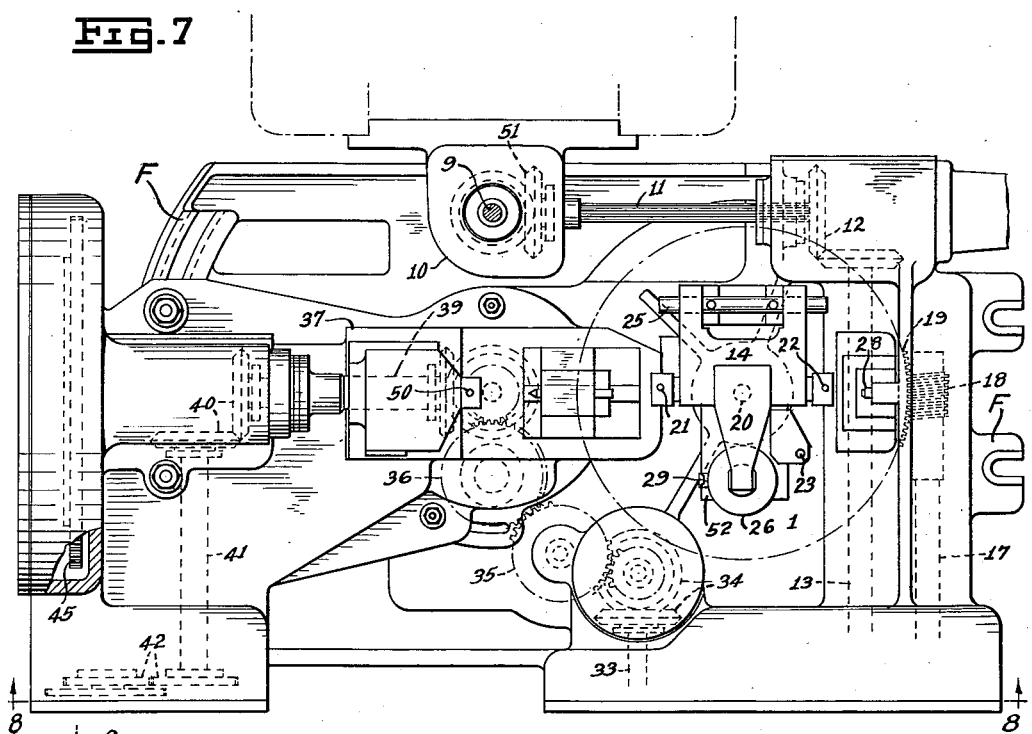
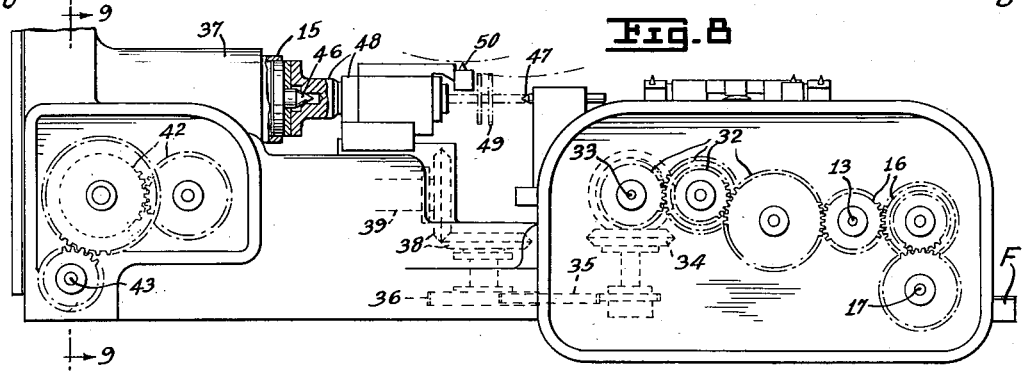
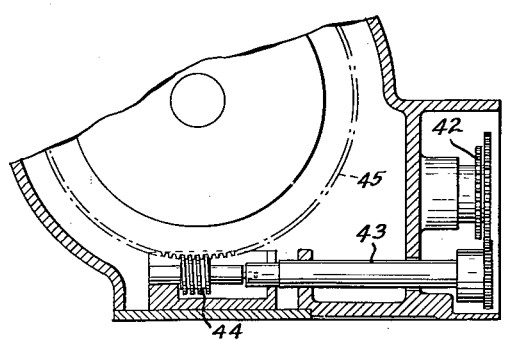
INVENTOR
Joseph J. Osplack
BY
Pennie, Edmonds, Morton & Barrows
ATTORNEYS Patented Feb. 26, 1952

2,587,202

UNITED STATES PATENT OFFICE 2,587,202

HOBBING GRINDER AND WHEEL DRESSER

Joseph J. Osplack, Detroit, Mich., assignor to Vinco Corporation, Detroit, Mich., a corporation of Michigan Application March 5, 1947, Serial No. 732,521

11 Claims. (Cl. 51—95).

This invention relates to a hobbing-grinder and wheel-dresser fixture for a movable-table machine tool base and especially to a fixture for attachment to a movable-table machine tool base of the type described in the application of Racy D. Bennett; Serial No. 498,763, filed August 16, 1943, which issued as Patent No. 2,442,635 dated June 1, 1948, capable of the precision hobbing of gears by grinding from the blank according to the method described in my copending application, Ser. No. 650,831; filed February 28, 1946, in combination with cooperating means for precisely dressing the grinding wheel.

Broadly, this fixture comprises a vertical column attached to the machine base and carrying the grinding wheel spindle extending horizontally perpendicular to the direction of motion of the movable table and capable of adjustment toward and away from that table vertically and driven work-carrying and wheel dressing portions mounted upon a common frame or base casting. This frame is carried by the movable table and supports the gear trains from which both work drive and dresser drive receive their driving impulse from the grinder wheel spindle drive. The whole is so arranged that work and dresser can be moved horizontally with the table and the spindle vertically in the column while rotating.

One distinguishing feature of this combined hobbing grinder and wheel-dresser fixture is that the wheel is dressed exactly at its place of contact with the work. A further feature is that the movement of the diamonds on the dresser necessary to produce the correct lead of the helical hobbing threads on the grinding wheel is produced by the movement of a rotary diamond carrier through a small arc of its circle of rotation and the feed of the diamonds is automatically accomplished during a portion of that rotary path when the diamonds are not in contact with the grinding wheel. Thus a fully automatic action is accomplished without the use of lead screws and without the necessity of reversing the direction of travel of the diamonds. This construction is productive of the marked simplification of the dresser mechanism and, because only rotary motions are involved, a high degree of precision in the manufacture of the machine can be obtained at relatively low cost. It is, of course, apparent that the theoretical accuracy of lead produced by even a small arc of a uniform rotary motion is not perfect. But, over that portion of the face of the hobbing grinding wheel which actually touches the work, the deviation from theoretical accuracy is so slight as to be undetectable in the limits even of closest manufacturing tolerances, since the wheel rotates in a single plane and as a result only about three threads are used.

For a complete description of my hobbing-grinding and wheel-dresser fixture, reference is made to the accompanying drawings, in which:

Fig. 2 is a close-up, perspective view of a portion of the fixture illustrating a spur gear in grinding position and the dresser withdrawn from contact with the grinding wheel;

Fig. 3 is a view similar to Fig. 2 illustrating a helical gear on the work-carrying portion of the fixture withdrawn from and the dresser portion in operative contact with the grinding wheel;

Fig. 6 is a detailed elevation partially in section showing the mounting of the grinding wheel spindle, spindle slide and spindle drive in the column attached to the machine base and the gear train by which spindle drive is interconnected with dresser and work drive;

Fig. 7 is a detailed plan view partially in section illustrating the work and dresser drives;

Fig. 8 is a partially sectional elevation through the machine taken on the line 8—8 of Fig. 7;

Fig. 9 is a partial vertical section taken on the line 9—9 of Fig. 8;

Fig. 10 is a detailed view illustrating the diamond carriers of the dreser; and

Fig. 11 is a view partially in section through the dresser drive mechanism illustrating a dresser feed.

Figure 1:
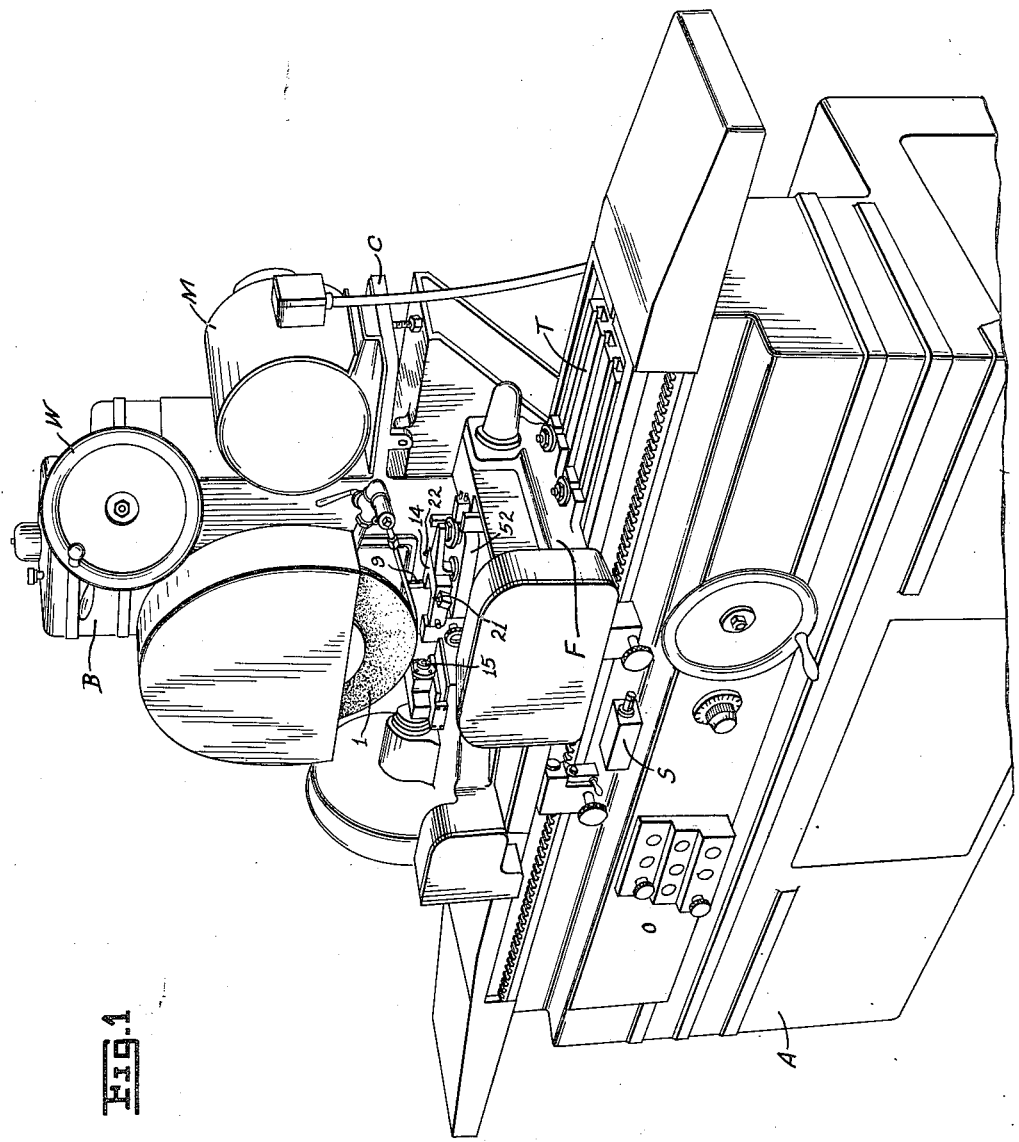
Fig. 1 is a perspective view of a movable table machine tool base fitted with the fixture of my invention.

Referring now to Fig. 1, the machine tool base A has a movable table T to which the frame F of the fixture carrying the dresser unit 14 and headstock spindle 15 are fastened. Base A also carries affixed thereto a vertical column B on which the fixture drive motor M is mounted on a bracket C.

As appears more clearly in Fig. 6, grinding wheel I is mounted on spindle 2 and driven by motor M through V-belts 3. Spindle 2 and parallel countershaft 4 are journalled in spindle slide 5 which is conventionally slidably mounted in column B with its vertical movement controlled by hand wheel W. Gear box 7, which forms a part of spindle slide 5, contains gear train 6 by which the rotation of countershaft 4 is synchronized with rotation of spindle 2. The miter gears 8 transmit power to the vertical spline shaft 9. The spindle slide 5 can thus be moved vertically while shaft 9 is rotating in synchronism with spindle 2. The lower end of shaft 9 enters gear box 10 which is fastened in a fixed position on column B.

Referring now more particularly to Figs. 7 and 8, the motion of vertical spline shaft 9 is transmitted through miter gears 51 in gear box 10 to horizontal spline shaft 11. The splines enable the frame F supporting work-carrying and wheel-dressing portions of the fixture attached to the movable table T of base A to be moved horizontally during rotation of shaft 11. Miter gears 12 transmit the revolving motion of shaft 11 to shaft 13, which is the main drive shaft for both the dresser unit 14 and the headstock spindle 15.

Taking up first the dresser drive, the dresser unit 14 is driven through change gears 16 which transmit the motion of shaft 13 to shaft 17. Shaft 17 is keyed to worm 18 which drives the worm wheel 19 fastened to vertical shaft 20 on which the dresser unit 14 is carried. The dresser unit 14 carries two finishing diamonds 21 and 22 spaced apart on opposite sides of and equally distant from the center of shaft 20 and a roughing-in diamond 23 at a like distance from the center of shaft 20.

Referring now to Fig. 3, when the dressing unit is being used to dress the face of grinding wheel 1, the dresser unit 14 is moved horizontally by motion of table T to a position directly beneath spindle 2. The rate of travel of diamonds 21 and 22 across the face of grinding wheel 1 and, thus, the lead of the hobbing thread to be dressed on that wheel is determined by appropriate selection of change gears 16. That is to say that, during one revolution of wheel 1, diamond 21 or diamond 22, as the case may be, will be caused to move across the face of wheel 1 a distance equal to the pitch of the hobbing thread. As has been previously indicated it is, of course, impossible for the circular motion of the diamond exactly theoretically to equal this pitch but, in the small segment of arc required for this motion, especially at the center of the face of the grinding wheel, the actual deviation from theoretical lead is negligible.

As can be seen in Fig. 10, the dresser unit 14 comprises a base member 52 affixed to shaft 20 and to which the finishing-diamonds carrier arm 24 is hinged by shaft 25. The diamonds 21 and 22, themselves, are pivotally mounted in holders 54 on carrier arm 24. The profile of the thread form to be dressed on wheel 1 is determined by the angular adjustment of diamonds 21 and 22 by rotation of holders 54 in carrier arm 24 and by the angular relation of carrier arm 24 to base member 52, which is secured by means of feed dial 26, which controls the setting of micrometer screw 27. Proper contact between the micrometer screw 27 and the end of carrier arm 24 is assured by the tension of spring 53 connecting base member 52 to arm 24.

It will be observed that finishing diamonds 21 and 22 are in dressing contact with wheel 1 alternately and separated by 180 degrees of rotation of shaft 20. It will be further observed that finishing diamonds 21 and 22 dress opposite faces of the hobbing thread on wheel 1 and are, therefore, set in angular relation to arm 24 parallel to one another, thus assuring symmetry of opposite faces of the hobbing thread.

The feed of diamonds 21 and 22 by means of micrometer screw 27 is secured by contact between feed plunger 28 and feed dial 26 (Fig. 2). Feed plunger 28 operates by making friction contact with feed dial 26 at a time in the cycle when neither diamond 21 nor diamond 22 is in contact with wheel 1. This friction contact by rotation of feed dial 26 elevates micrometer screw 27 a predetermined amount at each contact until the full depth of the thread on grinding wheel 1 is reached by diamonds 21 and 22. The amount of this feed is determined by the sum of the clearances 30 and 31 (Fig. 10), which represent the amount of vertical travel possible before either feed dial 26 or stop collar 56, affixed to micrometer screw 27, are brought into contact with the dresser unit base member 52. From a midpoint in this vertical travel determined by the pitch line of the thread to be dressed on the wheel 1, clearance 30 is adjusted to permit the desired diamond travel below pitch line and clearance 31 is adjusted to permit the desired diamond travel above pitch line. When the full depth of cut has been reached, the friction drive of feed plunger 28 on feed dial 26 merely slips and the feed consequently stops.

In this connection it will be observed that roughing diamond 23 is carried in its holder 55 in fixed space relation to dresser unit base member 52 and is incapable of adjustment to finish the faces of the hobbing thread on wheel 1. It is merely intended to remove at the proper lead the relatively large quantity of material necessary to rough in the thread which is later to be finished by diamonds 21 and 22.

Figure 4:
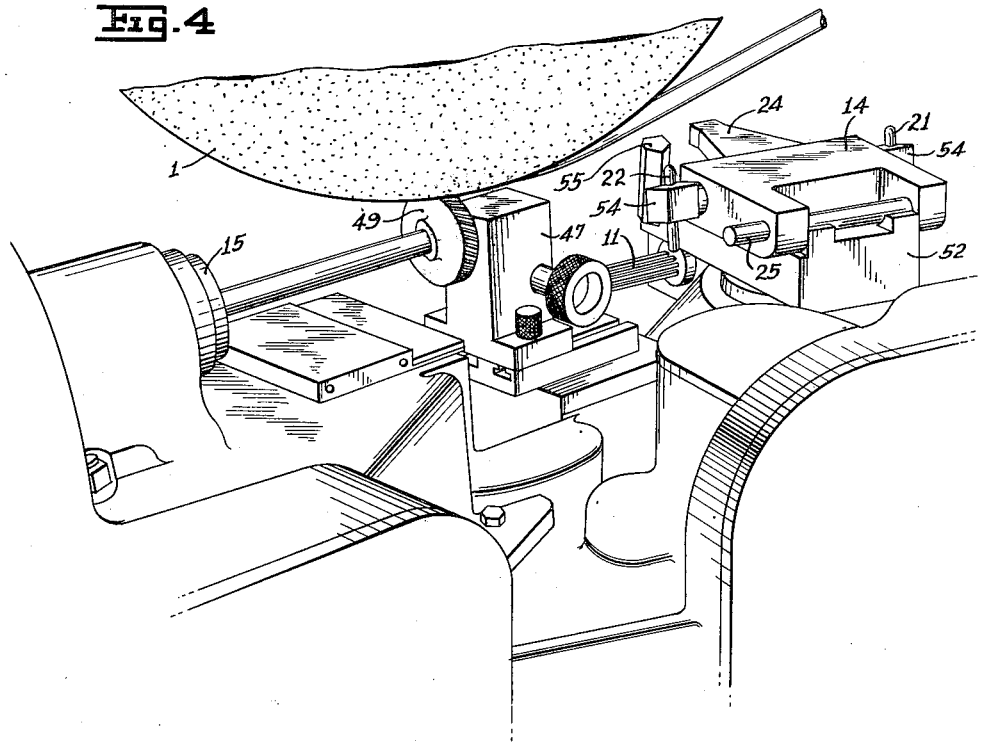
Fig. 4 is a view similar to Fig. 3 illustrating the helical gear in grinding position and the dresser portion of the fixture withdrawn from contact with the grinding wheel.
Figure 5:
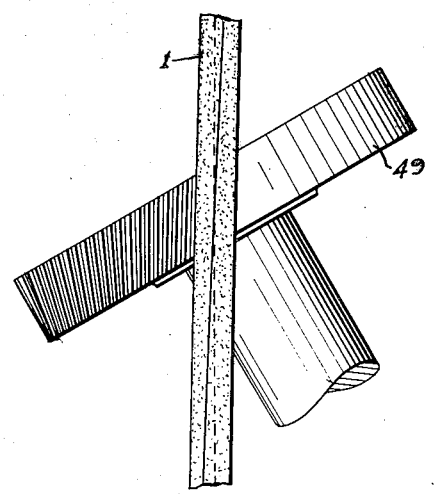
Fig. 5 is an enlarged view illustrating the grinding contact between the grinding wheel and helical gear of Fig. 4.

Turning now to the work drive especially illustrated in Figs. 7, 8 and 9, change gears 32 transmit the rotation of shaft 13 to shaft 33 which drives miter gears 34. From miter gears 34 rotation is transmitted through spur gears 35 to vertical shaft 36. It will be observed that the vertical arrangement permits the swinging of the entire head stock housing 37 about the shaft 36 to permit the grinding of a helical gear, as illustrated particularly in Figs. 3, 4 and 5. Through miter gears 38, shaft 36 transmits rotation to shaft 39 which in turn drives miter gears 40 rotating shaft 41. The change gears 42 transmit the motion of shaft 41 to shaft 43 which is keyed to worm 44. Worm 44 drives the worm wheel 45 which is fastened to head stock spindle 15. Head stock spindle 15 is provided with a 60 degree center 46 and is arranged to cooperate with tail stock 47, which is also carried on head stock housing 37. A special spindle adaptor and support 48 are made for driving each particular gear 49, which is the production part to be ground by the fixture. By means of change gears 32 and 42, the speed of the head stock spindle 15 is synchronized with that of wheel 1 so that, for each revolution of latter, the former rotates an amount equal to one tooth of the gear 49 to be ground.

As shown in Fig. 8, a stationary diamond 50 is used, mounted on the head stock housing 37 to dress the outside diameter of the wheel 1 prior to roughing in its thread with diamond 23 and finish dressing its thread with diamonds 21 and 22.

In order to describe the complete sequence of operations intended to be carried out by the fixture of my invention, let us suppose that we desire to grind a precision helical gear of specified helix angle and pitch.

Before placing the work in the head stock, we will first set up change gears 16 to synchronize the rate of rotation of dresser unit 14 with that of grinding wheel 1 so that the distance per revolution of wheel 1 that each diamond moves on its circular path equals the lead of the thread to be dressed. We will then set up the change gears 32 and 34 to synchronize the rate of rotation of head stock spindle 15 with that of grinding wheel 1 so that, for each revolution of the wheel 1, the head stock 15 will turn through an angle equal to 360 degrees divided by the number of teeth on the finished gear.

By means of movable table T built into base A, we then move diamond 50 into position for dressing the outside diameter of wheel 1, and complete this initial step as a hand controlled operation. It will be observed that both head stock 15 and dresser unit 14 rotate in the predetermined synchronism with wheel 1 whenever wheel 1 is in motion. Having completed the dressing of the outside diameter of wheel 1, the movable table T will be employed to bring dresser unit 14 into a position in which roughing diamond 23 will rough in the desired hobbing thread. That is to say that, in Fig. 1, the portion of the unit shown attached to the movable table T of base A will be moved to the left until the path of rotation of diamond 23 is tangent to a perpendicular plane through the center line of spindle 2 at the midpoint of the face of wheel 1. With diamonds 21 and 22 turned in carrier arm 24 to be entirely out of contact with wheel 1, the roughing-in operation is carried on with hand feed until a satisfactory roughing in of the hobbing thread on the face of wheel 1 has been accomplished.

Thereafter, diamond 23 is withdrawn from possible contact with the face of wheel 1 and diamonds 21 and 22 are adjusted to provide the appropriate profile of the thread on the face of wheel 1 by suitable adjustment of the angle of their holders 54 in carrier arm 24 and by adjustment of the stops controlling feed screw 27. Feed screw 27 is then withdrawn by means of feed dial 26 to its lower limit and the mechanism set in motion. The rotation of dresser unit 14 then causes the finishing diamonds 21 and 22 to finish dressing the thread of wheel 1 at the exact point in space in which it will grind. The diamonds 21 and 22 cut alternately each 180 degrees of revolution of unit 14, being advanced by feed screw 27 one predetermined increment through friction action of feed plunger 28 until the predetermined depth of feed is reached. For each pass across wheel 1, it will be observed that each diamond dresses a distance of the circumference of the wheel multiplied by the number of threads being cut.

The portions of the fixture carried by the movable bed T are then shifted to the right, in Fig. 1, withdrawing the dresser unit 14 from contact with grinding wheel 1. The grinding wheel 1 is raised by means of hand wheel W and the work to be ground, 49, is placed between head stock adaptor 48 and tail stock 47. Head stock housing 37 is then adjusted to the appropriate helix angle to be ground and the machine is set in motion. For this operation, automatic horizontal movement of the movable table T is assured by the limit switch mechanism designated S on base A in Fig. 1. As the work is carried backward and forward across the face of grinding wheel 1, the teeth of the gear are ground to the closest manufacturing tolerances, the involute form of the teeth being, of course, assured by the nature of the relative motion produced by the hobbing principle between the straight flank of the thread of the face of the grinding wheel and the metal of the part to be ground.

I claim:

1. A machine tool including, in combination, a base, a horizontally movable table carried by said base, a vertical column affixed to said base extending higher than said table, a spindle bearing vertically slidably mounted in said column, a spindle journalled in said bearing extending horizontally over said table generally perpendicular to the direction of movement thereof, a motor, a power transmission from said motor to said spindle, a grinding wheel having a helically-threaded peripheral surface on the end of said spindle above said table, a frame affixed to said table beneath said wheel, a generally horizontal rotating arm journalled about a vertical axis in and positioned above said frame, at least one wheel dressing tool carried on the upper side of said arm, synchronizing drive means from said spindle to said arm, a work holder rotating about a horizontal axis mounted on and positioned above said frame, and synchronizing drive means from said spindle to said work holder, the several elements recited being so positioned and arranged that by movement of said table dressing contact between said wheel and said tool or grinding contact between said wheel and work in said holder at the same point on the periphery of said wheel can be effected at will.

2. The combination of claim 1 in which the synchronizing drive means from the spindle to the arm and to the work holder includes a first gear movable with and driven from said spindle, a vertically externally splined shaft rotatably mounted in fixed space relation to the column, and a second gear internally splined rotatably mounted in fixed space relation to said spindle slidably engaging said splined shaft and in mesh with said first gear.

3. The combination of claim 1 in which the synchronizing drive means from the spindle to the arm and to the work holder includes a first gear rotatablly mounted in fixed spaced relation to the base driven from said spindle, a horizontal externally splined shaft driven by said first gear in fixed space relation thereto, and a second gear internally splined rotatably mounted in fixed space relation to the frame slidably engaging sad splined shaft.

4. The combination of claim 1 in which the synchronizing drive means from the spindle to the arm includes a set of change gears driven from said spindle and driving said arm.

5. The combination of claim 1 in which the synchronizing drive means from the spindle to the work holder includes a set of change gears driven from said spindle and driving said work holder.

6. The combination of claim 5 which includes a headstock housing mounted on the frame pivotable in a horizontal plane about a fixed pivot, a vertical shaft whose center line would intersect said fixed pivot journalled in said frame, a first gear journalled in said frame driving said vertical shaft and driven from the spindle and a second gear driven from said vertical shaft driving the work holder and carried by said headstock housing.

7. The combination of claim 1 in which the synchronizing drive means from the spindle to the arm includes a vertical shaft journalled in the frame driven in predetermined timed relation to the rotation of the spindle and the rotating arm includes a base member carried by said shaft and a plurality of diamonds carried by said base member spaced apart in the same horizontal plane equidistant from the center of said shaft.

8. The combination of claim 7 which includes a carrier arm hinged at one end to move in an arc in a vertical plane above the base member, a pair of diamond holders mounted on said carrier arm on opposite sides thereof on a line through the center of the shaft, and a feed screw carried by said base member in operative engagement with the other end of said carrier arm.

9. The combination of claim 8 which includes a manipulating member carried by the feed screw and a spring-pressed plunger carried by the frame adapted to make momentary friction contact with said manipulating member once during each revolution of the base member.

10. As a sub-combination, a diamond carrier rotatable about an axis perpendicular to a first reference plane, a threaded grinding wheel rotatable about an axis perpendicular to a second reference plane, said first reference plane being perpendicular to said second reference plane and also perpendicular to a radius of said wheel without intersecting the axis thereof, and a plurality of diamonds carried by said carrier all in the same plane parallel to the first reference plane and all equidistant from the axis of rotation of said carrier, the circular path of said diamonds being such that a line tangent thereto is parallel to the axis of rotation of said wheel and intersects a tangent to the periphery thereof, each at their points of tangency.

11. The combination of claim 10 in which the rotation of the wheel is synchronized to the rotation of the carrier so that during one revolution of the wheel a point on the circular path of the diamonds in the vicinity of the intersecting tangents will move a distance substantially equal to the pitch of the wheel thread.

JOSEPH J. OSPLACK.

REFERENCES CITED

The following references are of record in the file of this patent:

UNITED STATES PATENTS

| Number | Name | Date |
| --- | --- | --- |
| 1,426,630 | Simmons | Aug. 22, 1922 |
| 1,501,230 | Olson | July 15, 1924 |
| 1,626,232 | Gagarin | Apr. 26, 1927 |
| 1,642,554 | Olson | Sept. 13, 1927 |
| 1,839,693 | Miller | Jan. 5, 1932 |
| 1,842,538 | Burgess | Jan. 26, 1932 |
| 2,014,955 | Taylor | Sept. 17, 1935 |
| 2,309,312 | Harley et al. | Jan. 26, 1943 |